(No Model.)
F. A. RUFF.
PARCEL AND LUGGAGE CARRIER.
No. 562,744. Patented June 23, 1896.
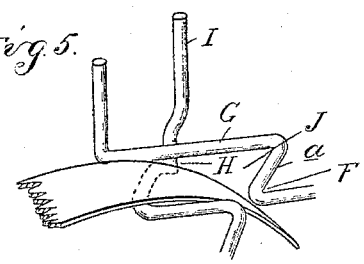
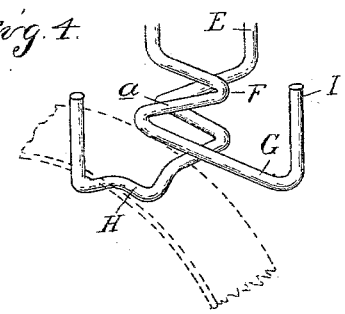
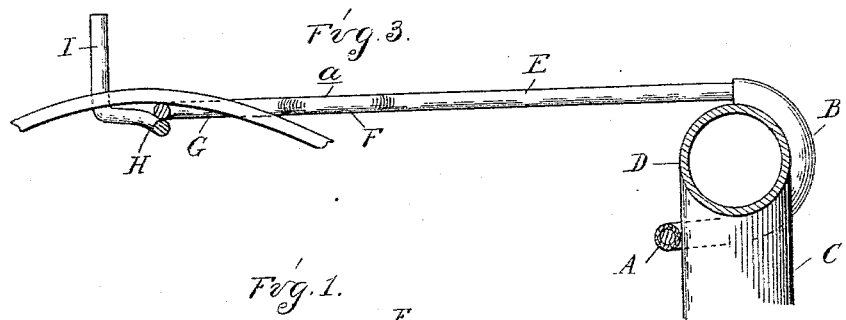
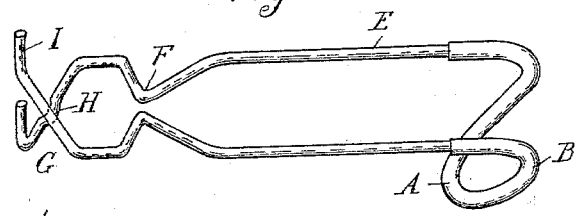
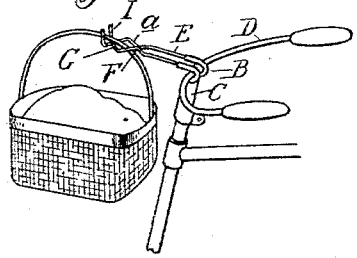
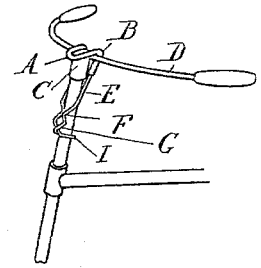
Witnesses
A. L. Hobby
O. F. Bartlett
Inventor
Frederick A. Ruff
By Wm. S. Sprague & Son,
Attys.

UNITED STATES PATENT OFFICE.

FREDERICK A. RUFF, OF DETROIT, MICHIGAN.

PARCEL AND LUGGAGE CARRIER.

SPECIFICATION forming part of Letters Patent No. 562,744, dated June 23, 1896.

Application filed December 23, 1895. Serial No. 573,139. (No model.)

*To all whom it may concern:*

Be it known that I, FREDERICK A. RUFF, a citizen of the United States, residing at Detroit, in the county of Wayne and State of Michigan, have invented certain new and useful Improvements in Parcel and Luggage Carriers, of which the following is a specification, reference being had therein to the accompanying drawings.

The invention consists in the construction of a luggage-carrier for bicycles, and particularly in its construction from a single bar or piece of wire, bent to form forwardly-projecting spring-arms, adapted to support the load. The inner end of the carrier is constructed to detachably connect with the bicycle head or handle.

In the drawings, Figure 1 is a perspective view of my device. Fig. 2 is a perspective view showing it in use as carrying a basket. Fig. 3 is a longitudinal section of the device, showing the basket-handle engaged in the jaws. Figs. 4 and 5 are perspective views of the jaws, illustrating the manner of engaging a basket-handle therewith. Fig. 6 is a perspective view showing the device when not in use.

I preferably form my device of a piece of spring-wire, bending it centrally, as at A, to form a loop, and this loop is bent down to form the hook B, the loop being adapted to embrace the steering-head C of a bicycle and the hook B to embrace the handle-bar D thereof, as plainly shown in Fig. 3. When thus bent and arranged, there are two parallel spring-arms E, projecting horizontally from the hook or securing portion of the device. At the outer end these arms are bent to form the inwardly-extending bends or elbows F, the inner ends of which approach each other closely. Beyond the elbows the arms are bent to form the jaws G, which cross each other, as shown in Fig. 5. The lower jaw is preferably formed with a notch or dent H, in which the upper jaw engages. At the end of the jaws the free disconnected ends of the wire are bent upward at substantially right angles to the plane of the arms E, to form the pins or standards I, over which the securing-eye of a lamp may be engaged. The parts being thus constructed, the device can be attached to a bicycle by opening the jaws and engaging it over the steering-head C and then turning it so that it will be in the position shown in Fig. 3. When it is desired to use it, it may be replaced in the pocket of the operator or engaged over the steering-head and handle, as shown in Fig. 6.

To engage a basket-handle with the holder, the operator grasps the jaws G in his hand and compresses them so as to expose the lower jaw, as shown in Fig. 4. Then laying the basket-handle thereon and releasing his grip the upper jaw will spring back over the handle of the basket and by a slight turn it will be engaged in the space or aperture J between the elbows F and the jaws G. Then by lifting the handle of the basket over one of the pins or standards I it may be engaged between those standards and will then be in the position shown in Figs. 2 and 3. In this position any swinging strain of the load will tend to force the elbows F apart because of the bearing of the handle upon the inclined faces *a* of the elbows, which will cause the pins I to approach each other and thereby firmly grip the handle between them. Thus the basket will be held firmly at all times.

As previously described, the socket or eye of the lamp-support may be engaged over the pins I and a bundle of any kind may be tied to the arms or the jaw portion thereof, and such article will be sustained upon the spring-arms in a satisfactory manner.

If desired, the loop A and hook B may be covered with rubber tubing, as shown in Fig. 5.

What I claim as my invention is—

1. A baggage-carrier for bicycles, comprising means for securing it to the bicycle-head, and two independent forwardly-extending spring-arms having crossing jaws near their ends and vertical pins at the ends of the jaws.

2. A luggage-carrier for bicycles comprising a securing-section fashioned to embrace a portion of the machine and independent forwardly-extending arms having free disconnected outer ends bent to overlap, and offsets at the ends of the arms, substantially as described.

3. A luggage-carrier for bicycles comprising a single piece of spring metal bent to form a hooked loop, and forwardly-extending spring-arms, the inward bends or elbows F near the outer ends, the overlapping jaws G and the pins or standards I, substantially as described.

In testimony whereof I affix my signature in presence of two witnesses.

FREDERICK A. RUFF.

Witnesses:
M. B. O'DOGHERTY,
JAS. WHITTEMORE.